(12) United States Patent
Yamamoto et al.

(10) Patent No.: US 9,188,420 B2
(45) Date of Patent: Nov. 17, 2015

(54) EYEGLASS FRAME SHAPE MEASUREMENT APPARATUS

(71) Applicant: NIDEK CO., LTD., Gamagori, Aichi (JP)

(72) Inventors: Takayasu Yamamoto, Toyokawa (JP); Motoshi Tanaka, Gamagori (JP); Ryoji Shibata, Toyokawa (JP)

(73) Assignee: NIDEK CO., LTD., Aichi (JP)

( * ) Notice: Subject to any disclaimer, the term of this patent is extended or adjusted under 35 U.S.C. 154(b) by 144 days.

(21) Appl. No.: 13/946,306

(22) Filed: Jul. 19, 2013

(65) Prior Publication Data

US 2014/0020254 A1 Jan. 23, 2014

(30) Foreign Application Priority Data

Jul. 23, 2012 (JP) ................ 2012-163009

(51) Int. Cl.
*G01B 5/20* (2006.01)
*G02C 13/00* (2006.01)

(52) U.S. Cl.
CPC ............... *G01B 5/20* (2013.01); *G02C 13/005* (2013.01)

(58) Field of Classification Search
CPC ....... G01B 5/20; G02C 13/003; G02C 13/005
USPC .......................................... 33/200
See application file for complete search history.

(56) References Cited

U.S. PATENT DOCUMENTS

| | | | | |
|---|---|---|---|---|
| 5,097,600 A * | 3/1992 | Brule et al. | ............... | 33/28 |
| 5,121,550 A * | 6/1992 | Wood et al. | ............... | 33/551 |
| 5,377,456 A * | 1/1995 | Dixon | ............... | 451/364 |
| 5,450,335 A * | 9/1995 | Kikuchi | ............... | 702/168 |
| 5,515,612 A * | 5/1996 | Igarashi et al. | ............... | 33/200 |
| 6,325,700 B1 | 12/2001 | Mizuno et al. | | |
| 6,350,190 B1 | 2/2002 | Matsuyama | | |
| 7,125,314 B2 | 10/2006 | Shibata | | |
| 7,631,431 B2 * | 12/2009 | Matsuyama | ............... | 33/28 |
| 7,681,321 B2 * | 3/2010 | Shibata | ............... | 33/200 |

(Continued)

FOREIGN PATENT DOCUMENTS

| | | |
|---|---|---|
| JP | 2000-314617 A | 11/2000 |
| JP | 2006102846 A | 4/2006 |
| JP | 2007233009 A | 9/2007 |

OTHER PUBLICATIONS

Search Report dated Oct. 29, 2013, issued by thw European Patent Office in counterpart European Application No. 13003669.2.

(Continued)

*Primary Examiner* — Christopher Fulton
(74) *Attorney, Agent, or Firm* — Sughrue Mion, PLLC (57) ABSTRACT

An eyeglass frame shape measurement apparatus includes a measuring unit measuring shapes of right and left rims of an eyeglass frame. Measuring modes include a first measuring mode in which whole peripheries of both rims are measured; a second measuring mode in which the whole periphery of one of the right and left rims; and a third measuring mode in which nose side portions of the left rim and the nose side portion of the right rim are partially measured. A controller drives the measuring unit to measure the whole peripheries of both rims in the first measuring mode, for driving the measuring unit to measure the whole periphery of one of the left and right rims in the second mode, and drive the measuring unit to measure partially the nose side portions of both rims in the third mode.

9 Claims, 8 Drawing Sheets

(56) References Cited

U.S. PATENT DOCUMENTS

| | | |
|---|---|---|
| 7,840,294 B2 | 11/2010 | Takeichi |
| 7,874,079 B2 * | 1/2011 | Andrews et al. .............. 33/507 |
| 8,205,986 B2 * | 6/2012 | Dubois et al. ............ 351/159.73 |
| 8,578,617 B2 * | 11/2013 | Matsuyama .................... 33/200 |
| 8,844,146 B2 * | 9/2014 | Matsuyama et al. ............ 33/200 |
| 2006/0073772 A1 | 4/2006 | Shibata |
| 2007/0213861 A1 | 9/2007 | Takeichi |
| 2011/0131823 A1 | 6/2011 | Matsuyama |

OTHER PUBLICATIONS

Anonymous, "Satellite Tracer Model LT-900 Operator's Manual", NIDEK, Mar. 31, 2006, XP-002714514, 35 pages total.

* cited by examiner

EYEGLASS FRAME SHAPE MEASUREMENT APPARATUS

CROSS-REFERENCE TO RELATED APPLICATION

This application is based upon and claims the benefit of priority of Japanese Patent Application No. 2012-163009 filed on Jul. 23, 2012, the contents of which are incorporated herein by reference in its entirety.

BACKGROUND

The present invention relates to an eyeglass frame shape measurement apparatus for measuring, the shapes of the rims of an eyeglass frame.

There is known an eyeglass frame shape measurement apparatus (for example, see Japanese Patent Publication 2000-314617) which includes a frame hold unit for holding the right and left rims of an eyeglass frame, and a measurement unit for inserting a tracing stylus into the grooves of the rims of the eyeglass frame held by the frame hold unit and detecting the movement of the tracing stylus to thereby measure the shapes of the rims.

This type of apparatus, normally, uses a two-rim support trace mode in which right and left rims are both held by the frame hold unit and the right and left rims are measured successively. The two-rim support trace mode can obtain the shapes of the right and left rims and also the mutual position relationship data between the right and left rim shapes. The position relationship data includes data on the geometric inter-center distance of the right and left rims (FPD), the nose width (DBL) between the nose side end of the left rim and the nose side end of the right rim, and the curve angle of the frame (rims). The data obtained by the eyeglass frame shape measurement apparatus are used as basic data for eyeglass lens periphery processing to be executed by an eyeglass lens periphery processing apparatus.

SUMMARY

Recently, there has been increasing a high-curve frame having a large frame (rim) curve angle such as a sunglass frame and a sports frame. When trying to automatically measure the right and left rims of such high-curve frame sequentially in the two-rim support trace mode, in the case that the leading end of the tracing stylus diverges greatly from the direction of the grooves of the rims, there is a possibility that the tracing stylus can diverge from the rims grooves, thereby failing in measurement. When a rim varies greatly in a direction perpendicular to a radius vector direction to be measured by the measurement unit are large, such variations are out of the measurement allowable range, thereby failing in the measurement of the whole periphery of the rim. In the case that measurement in the two-rim support trace mode fails, only the right rim is held by the frame hold unit and the whole periphery of the right rim is measured in a right rim (one rim) support trace mode. Only the left rim is held by the frame hold unit and the whole periphery of the left rim is measured in a left rim (one rim) support trace mode. Thus, this one rim support trace mode is used to measure the respective three-dimensional shapes of the right and left rims.

However, the one rim support trace mode cannot provide such data on the position relationship between the right and left rim shapes as in the two-rim support trace mode. In this case, in order to obtain the nose width (DBL) or geometric inter-center distance (FPD), separately, an operator must manually measure them using a measuring device such as vernier calipers and the operator must input data on the measured results. Or, the operator must input data previously obtained by a frame maker (such data is sometimes inscribed on the frame). However, it takes time and labor to use the measuring device such as the vernier calipers and measurements obtained by such measuring device are not correct. In most cases, the values inscribed on the frame are not accurate. It takes time and labor for the operator to measure the curved angle of the frame and the measured results are not correct.

The invention, in view of the above-mentioned conventional technology, has an object to provide an eyeglass frame shape measurement apparatus which, even in the case of a high-curve frame, can obtain the mutual position relationship data between right and left rim shapes.

An aspect of the present invention provides the following arrangements:

(1) An eyeglass frame shape measurement apparatus, comprising:

a frame holder configured to hold right and left rims of an eyeglass frame, the right and left rims including grooves respectively;

a measuring unit including a tracing stylus configured to be inserted into the grooves of the right and left rims, and detect movement of the tracing stylus to measure shapes of the rims;

a first measurement start signal input unit configured to input a first measurement start signal for a first measuring mode in which whole peripheries of the right and left rims are measured in a state that the right and left rims of the eyeglass frame are held by the frame holder;

a second measurement start signal input unit configured to input a second measurement start signal for a second measuring mode in which the whole periphery of one of the right and left rims of the eyeglass frame is measured in a state that the one of the right and left rims of the eyeglass frame is held by the frame holder;

a third measurement start signal input unit for inputting a third measurement start signal for a third measuring mode in which nose side portions of the left rim and the nose side portion of the right rim are partially measured in a state that the right and left rims of the eyeglass frame are held by the frame holder, the nose side portions including nose side ends of the left and right rims; and a controller configured to drive the measuring unit to measure the whole peripheries of the right and left rims when the first measurement start signal is input, for driving the measuring unit to measure the whole periphery of the one of the left and right rims held by the frame holder when the second measurement start signal is input, and for driving the measuring unit to measure partially the nose side portions of the left and right rims when the third measurement start signal is input.

(2) The eyeglass frame shape measurement apparatus according to (1), wherein the controller is configured to matches the measured result obtained in the second measuring mode with the measured result obtained in the third measuring mode, the controller is configured to execute:

first computing processing to move second left shape data of the left rim obtained in the second measuring mode with respect to first partial left shape data of the left rim obtained in the third measurement mode so that the second left shape data matches the first partial left shape data, to generate third left shape data of the left rim in a state that the left and right rims are held by the frame holder, and second computing processing to move second right shape data of the right rim obtained in the second measuring mode with respect to first partial right shape data of the right rim obtained in the third measurement mode so that the second right shape data matches the first partial right shape data, to generate third right shape data of the right rim in a state that the right and left rims are held by the frame holder; and the eyeglass frame shape measurement apparatus further comprises a computing instruction unit is configured to input an instruction signal for instructing the controller to execute the first and second computing processing.

(3) The eyeglass frame shape measurement apparatus according to (2), wherein the first computing processing obtains the third left shape data by comparing a position of the nose side end contained in the first left shape data with a position of the nose side end contained in the second left shape data, and the second computing processing obtains the third right shape data by comparing a position of the nose side end contained in the first right shape data with a position of the nose side end contained in the second right shape data.

(4) The eyeglass frame shape measurement apparatus according to (2), wherein the controller obtains position relationship data between the right and left rims based on the generated third left shape data of the left rim and the generated third right shape data of the right rim.

(5) The eyeglass frame shape measurement apparatus according to (4), wherein the controller obtains, as the position relationship data, a geometric inter-center distance between a geometric center of the left rim and a geometric center of the right rim when the eyeglass frame is viewed from a predetermined direction.

(6) The eyeglass frame shape measurement apparatus according to (4), wherein the controller obtains, as the position relationship data, at least one of a curve angle of the left rim and a curve angle of the right rim based on the generated third left shape data of the left rim and the generated third right shape data of the right rim.

(7) The eyeglass frame shape measurement apparatus according to (2), wherein the controller issues an instruction signal automatically when the measured results in the third measuring mode and in the second measuring mode are obtained.

(8) The eyeglass frame shape measurement apparatus according to (1), wherein the controller is configured to obtain position relationship data between the shape of the right rim and the shape of the left rim based on the measured results obtained by the measurement in the third measuring mode, and the controller obtains, as the position relationship data, a nose width distance between the nose side end of the right rim and the nose side end of the left rim.

DESCRIPTION OF EXEMPLARY EMBODIMENTS

Figure 1:
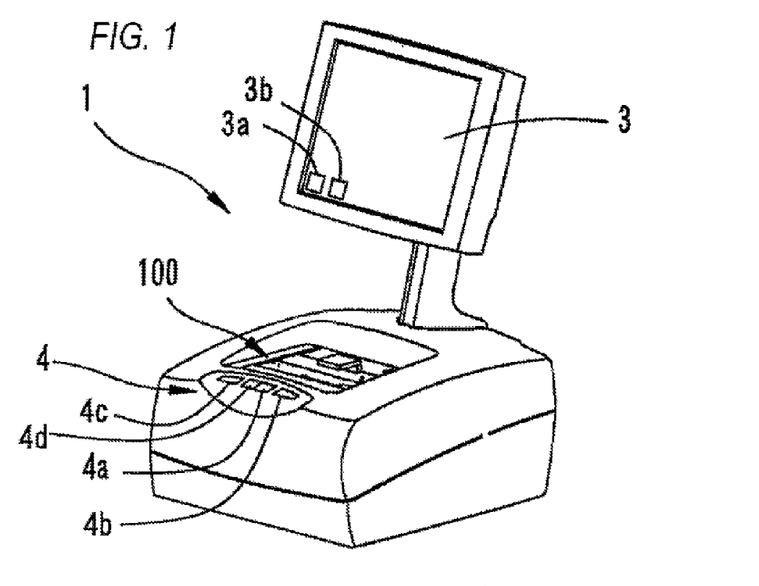
FIG. 1 is a schematic external view of an eyeglass frame shape measurement apparatus.

Now, description is given of an embodiment of the invention with reference to the accompanying drawings. FIG. 1 is a schematic external view of an eyeglass frame shape measurement apparatus. The eyeglass frame shape measurement apparatus 1 includes: a frame hold unit 100 for holding an eyeglass frame F in a desired state; and, a measuring unit 200 which inserts a tracing device (stylus) 281 into grooves (bevel grooves) formed in the rims of the eyeglass frame held by the frame hold unit 100, moves the tracing stylus 281 along the grooves of the rims and detects the movements of the tracing stylus to thereby obtain the three-dimensional shapes (target lens shapes) of the rims. The measuring unit 200 is used to trace the contours of the rims using the tracing stylus.

The apparatus 1 includes, on the rear side of its box body, a panel portion 3 having a display of a touch panel type. When processing the periphery of a lens, the lay-out data of the lens with respect to target lens data, lens processing conditions and the like can be input using the panel portion 3. Data on the rim three-dimensional shapes obtained by the apparatus 1 and data input by the panel portion 3 are transmitted to an eyeglass lens periphery processing apparatus.

The apparatus 1 includes a switch portion 4 which is an example of input means. The switch portion 4 includes a switch 4a for setting a two-rim support trace mode, a switch 4b for setting a right rim support trace mode, and a switch 4c for a left rim support trace mode, and a switch 4d for setting a nose side portion trace mode. The two-rim support trace mode is set in order to measure successively the shapes of the right and left rims. The right rim support trace mode is set in order to allow the frame hold unit 100 to hold only the right rim and to measure only the shape of the right rim. The left rim support trace mode is set in order to allow the frame hold unit 100 to hold only the left rim and to measure only the shape of the left rim. The nose side portion trace mode is set, when the two-rim support tracing mode fails in measurement, in order to measure partially the shapes of the nose side portions of the right and left rims to thereby obtain the nose widths of the right and left rims. Specific description of these trace modes is given later.

Here, the switches for setting (selecting) the respective tracing modes may also be provided on the display of the touch panel of the panel portion 3. The switches 4a, 4b, 4c and 4d (or the panel portion 3) are used to input measurement start signals for their respective modes, and the switch portion 4 functions also as the respective measurements start signals input unit. The right rim support trace mode and left rim support trace mode, with one of the right and left rims being held by the frame hold unit 100, are contained in a one rim support trace mode for measuring the whole periphery of such one rim.

The panel portion 3 includes on its screen: a switch 3a for inputting an instruction signal allowing a memory 51 (see FIG. 4B) to store therein data obtained by measurement in the nose side portion trace mode and data on at least one of the right and left rims obtained by measurement in one rim support trace mode (preferably, data on the right and left rims obtained by measurement respectively in the right rim support trace mode and in the left rim support trace mode), as mutually corresponding data sets; and, a switch 3b for inputting an instruction signal for "matching processing execution" which is described later.

Here, the frame hold unit 100, measuring unit 200, panel portion 3 and switch portion 4 may also be incorporated into the eyeglass lens periphery processing apparatus as in the Japanese Patent Publication 2000-314617.

Figure 2:
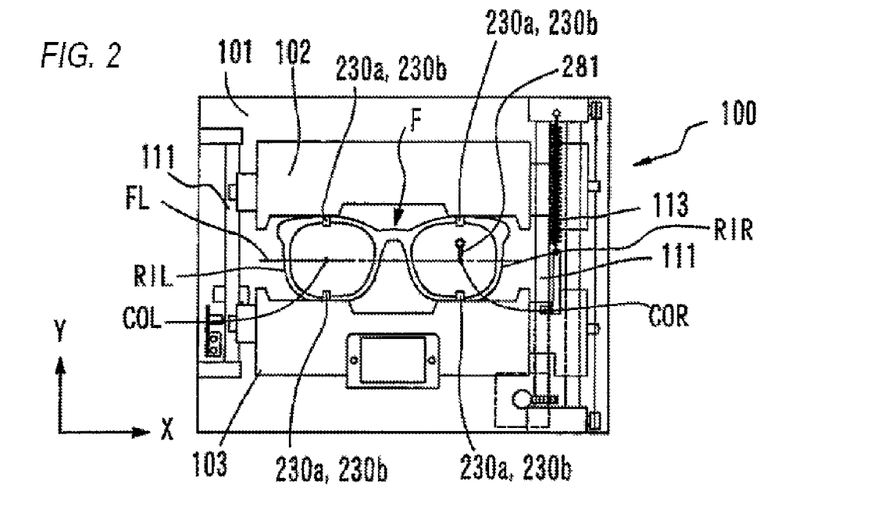
FIG. 2 is a top plan view of a frame hold unit.

FIG. 2 is a top plan view of the frame hold unit 100 with the eyeglass frame F held thereon. The measuring unit 200 is disposed on the lower side of the frame hold unit 100. On a hold portion base 101, there are put a first slider 102 and a second slider 103 for holding the eyeglass frame F (right rim RIR, left rim RIL) in a given state. The first slider 102 has a surface to be contacted with the vertical-direction upper portions of the left rim RIL and right rim RIR of the frame F. The second slider 103 has a surface to be contacted with the vertical-direction lower portions of the left rim RIL and right rim RIR of the frame F.

The first and second sliders 102 and 103 are disposed such that they can slide opposed to each other on two rails 111 across a center line FL in the X direction, while the sliders are always pulled toward the their center line FL by a spring 113.

The first slider 102 includes, as a hold mechanism for holding the upper portions of the left rim RIL and right rim RIR (the upper and lower portions of the rims mean the vertical-direction upper and lower portions thereof when a person wears the eyeglasses), clamp pins 230a and 230b respectively provided at two positions for clamping the right and left rims from the rim thickness directions (the front and rear sides of the rims when a person wears the eyeglasses). Similarly, the second slider 103 also includes, as a hold mechanism for holding the lower portions of the left rim RIL and right rim RIR, clamp pins 230a and 230b respectively provided at two positions for clamping the right and left rims from the rim thickness directions. The frame hold unit 100 can employ a well-known structure, for example, a structure disclosed in the Japanese Patent Publication 2000-314617 and the like.

Figure 3:
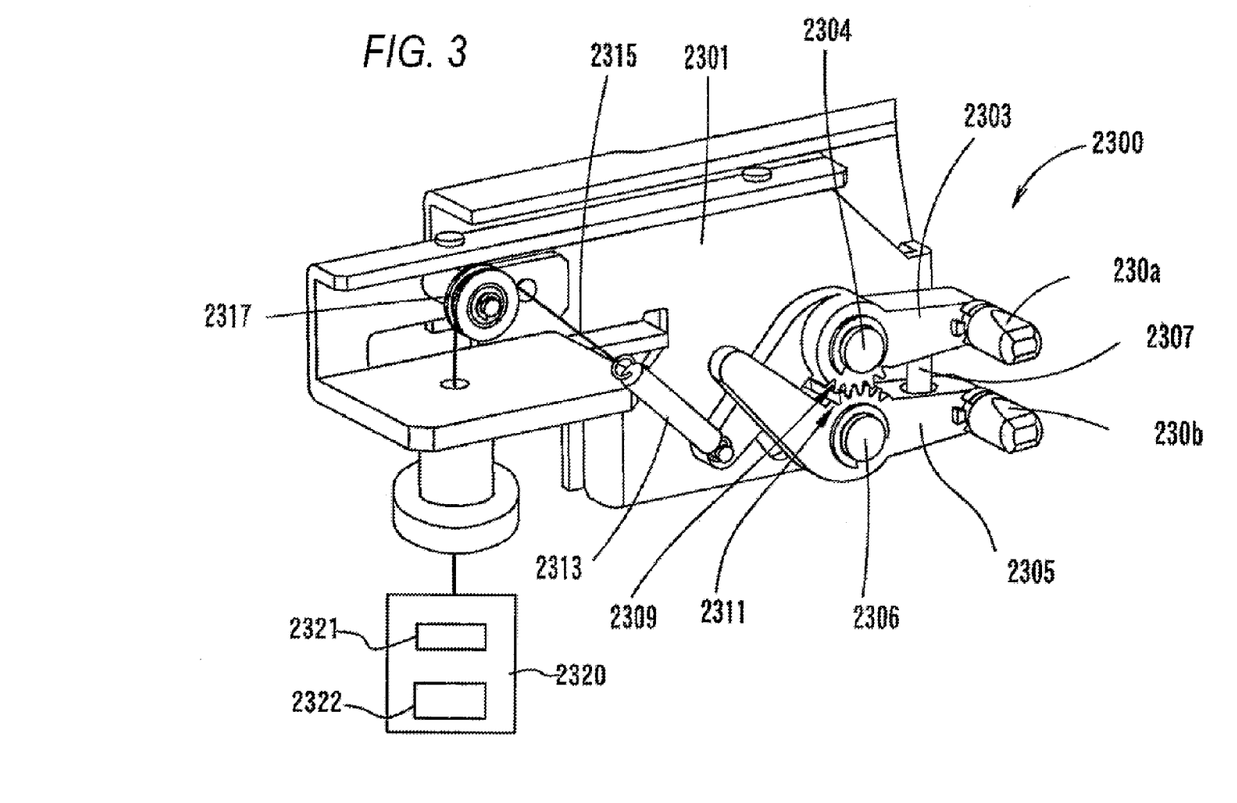
FIG. 3 is a schematic structure view of a clamp mechanism for clamping a rim.

FIG. 3 is a schematic structure view of a clamp mechanism 2300 disposed on the left of the first slider 102 for clamping the upper portion of the left rim RIL. A base plate 2301 is disposed within the first slider 102. The clamp pin 230a is mounted on the leading end of a first arm 2303. The central portion of the first arm 2303 is rotatably held on the base plate 2301 by a rotation shaft 2304. The clamp pin 230b is mounted on the leading end of a second arm 2305. The central portion of the second arm 2305 is rotatably held on the base plate 2301 by a rotation shaft 2306. A compression spring 2307 is mounted between the first arm 2303 and second arm 2305. The compression spring 2307 always energizes the two clamp pins 230a and 230b in a direction to make more space between them. In the central portion of the first arm 2303, there is formed a gear 2309 with the rotation shaft 2304 as its center. Similarly, in the central portion of the second arm 2305, there is formed a gear 2311 with the rotation shaft 2306 as its center, while the gear 2309 is meshed with the gear 2311.

One end of a spring 2313 is mounted on the rear end of the first arm 2303. A wire 2315 is fixed to the other end of the spring 2313. The wire 2315 is connected to a drive unit 2320 through a pulley 2317 rotatably mounted on the base plate 2301. The drive unit 2320 includes a shaft 2321 for winding the wire 2315 and a motor 2322 for rotating the shaft 2321. When the wire 2315 is pulled due to the driving of the motor 2322, the first arm 2303 is rotated clockwise about the rotation shaft 2304. In this case, since the gears 2309 and 2311 are meshed with each other, the second arm is rotated counterclockwise about the rotation shaft 2306. Thus, the two clamp pins 230a and 230b are closed cooperatively, whereby the rim RIL is clamped by the two clamp pins 230a and 230b.

A clamp mechanism, which is disposed on the right of the first slider 102 in order to clamp the upper portion of the right rim RIR, has a structure in which the right and left of the clamp mechanism 2300 are reversed. Clamp mechanisms, which are disposed in two positions on the left and right sides of the first slider 102, respectively have a structure in which the clamp mechanism 2300 disposed on the first slider 102 is turned upside down. Thus, description of other clamp mechanisms is omitted here. Here, the motor 2322 and shaft 2321 may be structured such that they are disposed in their respective four clamp mechanisms 2300, or may also be structured that they are used in common in the four clamp mechanisms 2300. In any case, the four clamp mechanisms 230a and 230b are opened and closed simultaneously.

Figure 4A:
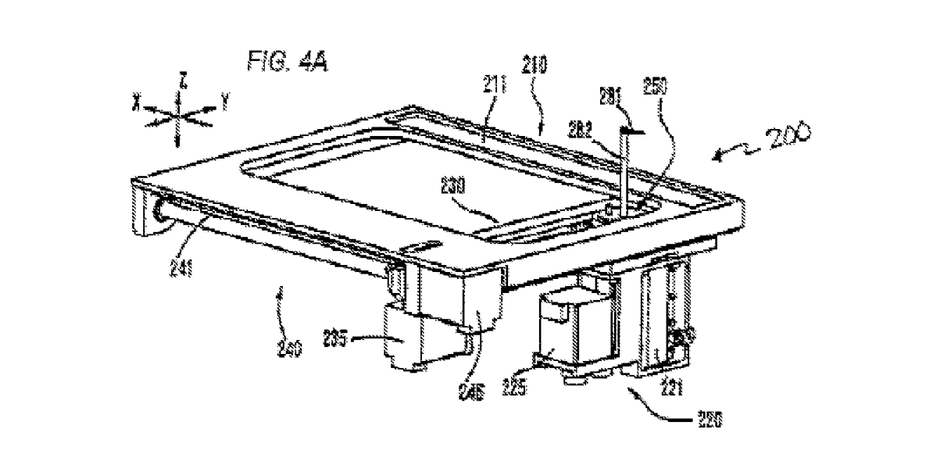
FIG. 4A is a schematic structure view of a measuring unit.
Figure 4B:
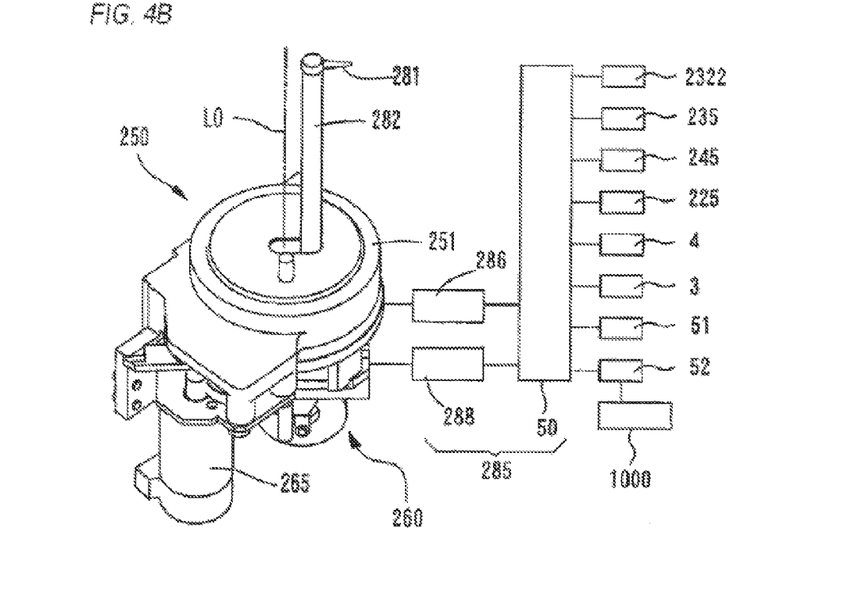
FIG. 4B is a schematic structure view of a measuring unit.

Next, description is given simply of the structure of the measuring unit 200. FIGS. 4A and 4B are respectively schematic structure views of the measuring unit 200. The measuring unit 200 includes a moving unit 210 for moving the tracing stylus 281 along the groove of the rim and a detecting unit 285 for detecting the moving position of the tracing stylus 281.

The moving unit 210, in this embodiment, includes a base portion 211 having a square-shaped frame extending in the horizontal direction (XY direction) and a tracing stylus hold unit 250 for holding a tracing shaft 282 with the tracing stylus 281 (to be inserted into the grooves of the rims RIL, RIR) mounted on its upper end, while the tracing stylus hold unit 250 is moved in the rim radius vector directions (X and Y directions) and in a direction (Z direction) perpendicular to the radius vector direction. The base portion 211 is disposed below the frame hold unit 100. The moving unit 210 further includes a Y moving unit 230 for moving the tracing stylus hold unit 250 in the Y direction, an X moving unit 240 for moving the Y moving unit 230 in the X direction, and a Z moving unit 220 for moving the tracing stylus hold unit 250 in the Z direction. The Y moving unit 230 includes a guide rail extending in the Y direction and, due to the driving of the motor 235, moves the tracing stylus hold unit 250 in the Y direction along the guide rail. The X moving unit 240 includes a guide rail 241 extending in the X direction and, due to the driving of the motor 245, moves the Y moving unit 230 in the X direction.

The Z moving unit 220 is mounted on the Y moving unit 230 and, when driven by the motor 225, it moves the tracing stylus hold unit 250 in the Z direction along a guide rail 221 extending in the Z direction. When measuring the two rims, the tracing stylus hold unit 250 is moved by the X moving unit 240 in the X direction, that is, in the right and left direction in such a manner that it can measure both of the left rim RIL and right rim RIR.

The tracing stylus hold unit 250 includes a rotation unit 260 which rotates a tracing stylus shaft 282 around a center shaft LO extending in the Z direction. The rotation unit 260 includes a rotation base 251 with a tracing stylus shaft 282 mounted thereon, and a motor 265 for rotating the rotation base 251 around the center shaft LO. The tracing stylus shaft 282 is held on the rotation base 251 movably (tiltably) in the lateral direction, that is, in the leading end direction of the tracing stylus 281. Here, the tracing stylus hold unit 250 includes a measuring pressure application mechanism (not shown) for applying measuring pressure with which the leading end of the tracing stylus 281 is pressed against the rim RIL (RIR).

The measuring unit 200 includes a detection unit 285 for detecting the position of the tracing stylus 281 being moved along the grooves of the rims. The detection unit 285 includes an encoder 286 and an encoder 288 respectively serving as detectors. The moving position of the tracing stylus 281 in the radius vector direction is detected by the encoder 286. The tracing stylus shaft 282 is held movably in the Z direction on the rotation base 251. The moving position of the tracing stylus 281 in the Z direction is detected by the encoder 288. Here, in this embodiment, the encoders 286 and 288 are respectively used to detect the positions of the tracing stylus 281 in the radius vector direction and in the Z direction with respect to the tracing stylus hold unit 250. The detection unit 285 includes, as a detector for detecting the moving position of the tracing stylus hold unit 250 in the radius vector direction, a control portion 50 for obtaining driving information about the motors 245, 235 and 265. The detection unit 285 also includes, as a detector for detecting the moving position of the tracing stylus hold unit 250 in the Z direction, the control portion 50 for obtaining driving information about a motor 225.

The control portion 50 is connected to the encoders 286, 288 and motors 225, 235, 245 255, 265. The control portion 50 is connected to the motors 2322 provided in the four portions, the switch portion 4, the panel portion 3, a memory 51 for storing measured data therein, a communication unit 52 and the like. The communication unit 52 is connected to an externally connected apparatus 1000 such as an external computer or an eyeglass lens processing apparatus, and thus it has the functions of a signal input unit and a data output unit. The control portion 50 functions as a computing portion which also has the function to calculate related data such as the geometric inter-center distance FPD of the two rims and the nose width DBL (distance between the nose side end of the right rim and the nose side end of the left rim).

Next, description is given of the operation of the apparatus having the above structure.

<Two-Rim Support Trace Mode>

Firstly, description is given of a case in which the two-rim support trace mode is set. In the case of a low-curve eyeglass frame in which the rim distance (height) in a direction perpendicular to the radius vector direction is within the measurement allowable range, normally, measurement in the two-rim support trace mode is possible. In this case, an operator sets the two-rim support trace mode using the switch 4a. In the two-rim support trace mode, the right and left rims are measured successively, thereby obtaining the mutual position relationship data on the right and left rims such as the respective three-dimensional shapes of the right and left rims, the distance FPD between the geometric center of the left rim and the geometric center of the right rim, the nose width DBL, namely, the distance between the nose sides of the right and left rims, and the curve angles of the right and left rims.

Figure 5:
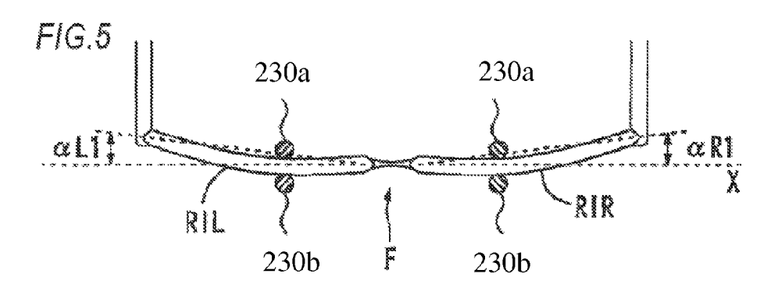
FIG. 5 shows a state where a frame F is held by the frame hold unit in a two-rim support trace mode.

As shown in FIG. 2, the operator holds the eyeglass frame F between the first and second sliders 102 and 103 and, as shown in FIG. 5, uses the clamp pins 230a and 230b to clamp the respective upper and lower portions of the left rim RIL and right rim RIR, thereby allowing the frame hold unit 100 to hold the eyeglass frame F.

After completion of holding of the eyeglass frame F by the frame hold unit 100, when the switch 4a is depressed and a two-rim support trace mode measurement start signal is input, the control portion 50 drives the measuring unit 200 to measure the whole peripheral shapes of the right and left rims. Firstly, in order to measure the shape of the right rim RIR, the control portion 50 drives the measuring unit 200 to move the tracing stylus 281 situated at its predetermined initial position, thereby inserting it into a predetermined measurement start position in the rim RIR. In this embodiment, the initial position of the tracing stylus 281 in the XY directions is set for a position COR (see FIG. 2) on the right rim RIR side. The X direction of the position COR is on the center line FL which is the center in the Y direction. The Y direction of the position COR is a direction where the clamp pins 230a and 230b for clamping the lower portion of the right rim RIR are disposed. In the two-rim support trace mode, for example, the measurement of the right rim RIR which is one of the right and left rims is executed firstly. The control portion 50, at the initial position COR, rotates the rotation unit 260 so that the leading end direction of the tracing stylus 281 faces the clamp pins 230a and 230b existing on the lower side of the right rim RIR. Next, the control portion 50 drives the moving unit 210 to move the tracing stylus hold unit 250 (tracing stylus 281) toward the rim so that the tracing stylus 281 situated at the initial position COR is contacted with the rim. The contact of the tracing stylus 281 with the groove of the rim can be detected by the encoder 286.

The control portion 50 moves the tracing stylus 281 situated at the clamp pins 230a, 230b existing on the lower side of the right rim RIR along the groove of the right rim the rim, RIR. The moving direction of the tracing stylus 281 at this time is a direction to go toward the ear or nose of the right rim RIR. In the structure of the measuring unit 200 of the present apparatus, when measuring the shape of the rim in the radius vector direction, the control portion 50 estimates the variation in the radius vector direction of the unmeasured portion of the rim according to the radius vector information which has been obtained after the start of measurement, determines the XY position to which the tracing stylus hold unit 250 is moved so that the leading end of the tracing stylus 281 can move along the variation in the radius vector direction of the unmeasured portion, and controls the driving of the respective motors of the moving unit 210 according to the thus determined XY position. This allows the tracing stylus 281 to follow the rim shape variations smoothly, whereby the radius vector information of the rim can be measured highly accurately.

When measuring the shape of the rim in the vertical direction, the control portion 50 estimates the Z position variations of the unmeasured portion of the rim according to Z direction information which has been obtained after start of measurement, determines a Z position to which the tracing stylus hold unit 250 is moved so that the leading end of the tracing stylus 281 can move along the Z position variations of the unmeasured portion, and controls the driving of the Z moving unit 220 (motor 225). Thus, in the Z direction measurement as well, the tracing stylus 281 is allowed to follow the rim shape variations smoothly, whereby the Z position of the rim can be measured highly accurately. As the rim Z position rises, the control portion 50 controls the moving unit 210 in such a manner that the tilt angle of the tracing stylus shaft 282 (a tilt angle in the opposite direction to the leading end direction of the tracing stylus 281) increases. Thus, the high curve frame can be measured while reducing a possibility that the tracing stylus 281 can deviate from the bevel groove of the rim in measurement.

When the tracing stylus 281 is moved along the whole periphery of the right rim RIR, the three-dimensional shape of the right rim RIR is measured. Data on the shape of the right rim RIR in the radius vector direction is obtained according to the detected results of the encoder 286, drive information about the X moving unit 240 and Y moving unit 230, and rotation information about the rotation base 251. Position data in the direction (Z direction) perpendicular to the radius vector direction is obtained according to the detected results of the encoder 288 and drive information about the Z moving unit 220. Here, the mechanism for detecting the position of the tracing stylus 281 is not limited to the structure of this embodiment but any other structure can be employed so long as it includes detectors respectively capable of detecting the radius vector direction and perpendicular direction.

After end of measurement of the right rim RIR, the control portion 50 drives the moving unit 210 to disengage the tracing stylus 281 from the groove of the right rim RIR and return it to the initial position COR. Next, the control portion 50, in order to measure the shape of the left rim RIL, drives the moving unit 210 to move the tracing stylus 281 to the initial position COL set for measuring the left rim RIL. The control portion 50 drives the moving unit 210 to insert the tracing stylus 281 into a predetermined measurement start position in the rim RIL. The measurement start position of the left rim RIL is the position of the clamp pins 230a, 230b. Similarly to the measurement of the right rim RIR, the control portion 50 drives the moving unit 210 to move the tracing stylus 281 inserted into the groove of the rim RIL along the groove of the left rim RIL so that it goes toward the ear from the clamp position of the clamp pins 230a, 230b.

When the tracing stylus 281 is moved along the whole periphery of the left rim RIL, similarly to the measurement of the right rim RIR, the three dimensional shape of the left rim RIL is measured by the detection unit 285.

Figure 6:
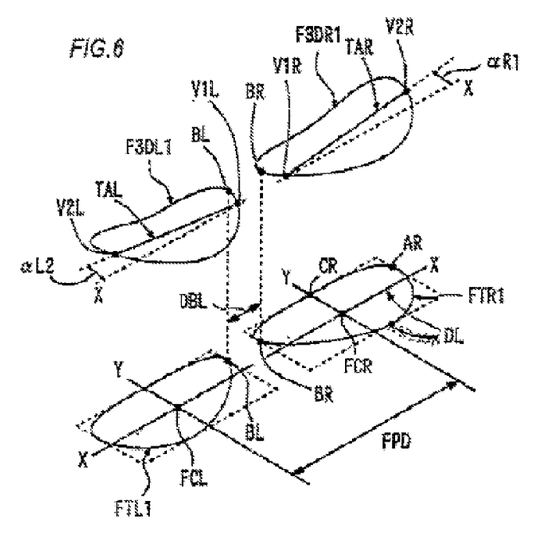
FIG. 6 shows an example of measured results obtained in the two-rim support trace mode.

FIG. 6 shows an example of the measured results obtained in the two-rim support trace mode. In FIG. 6, F3DR1 is the three-dimensional shape data of the right rim RIR obtained according to the detected results of the detection unit 285, while F3DL1 is the three-dimensional shape data of the left rim RIL. FTR1 is the two-dimensional target lens shape data (radius vector data) on the right rim RIR, while FTL1 is the two-dimensional target lens shape data (radius vector data) on the left rim RIL; and, their respective radius vector direction shapes are expressed by XY orthogonal axes data. Target lens shape data FTR1 and FTL1 also represent shapes provided when the three-dimensional shapes F3DR1 and F3DL1 are respectively projected on the XY plane of the Frame F in the front direction.

In the target lens FTR1 of the right rim RIR, a point in the ear side end in the X direction (in FIG. 6, the right-most side) is expressed as AR, a point in the nose side end in the X direction (in FIG. 6, the left-most side) as BR, a point in the upper end in the Y direction as CR, and a point in the lower end in the Y direction as DR, respectively; and, the geometric center (boxing center) of these points AR-BR-CR-DR is expressed as FCR. A line extending in the X direction and passing through the geometric center RCR is expressed as a datum line DL. In the three-dimensional shape data F3DR1 of the right rim RIR, points existing on the nose and ear sides in the X direction on the datum line DL are expressed as V1R and V2R respectively. A line segment connecting the points V1R and V2R to each other is expressed as TAR, while an angle formed between the line segment TAR and X-axis direction is expressed as αR1. This angle αR1 is calculated as the frame curve angle of the right rim RIR.

In the left rim RIL as well, according to a similar computing to the right rim RIR, the geometric center FCL in the target lens shape FTL1 of the left rim RIL and the frame curve angle αL1 of the left rim FIL are calculated. Here, the frame (rim) curve angle can be obtained as the average value of the angle αR1 and angle αL1. In FIG. 6, a point BL is a point on the nose side end in the X direction (in FIG. 6, the right-most side of FTL1) in the target lens shape FTL1 of the left rim RIL. The remaining same elements of the left rim RIL as those of the right rim RIR may be expressed by rewriting the respective "R"s of the designations used for the right rim RIR into "L"s and thus the description thereof is omitted here.

The geometric inter-center distance FPD is obtained from a difference between the X-direction coordinate positions of the center FCR of the right rim RIR and center FCL of the left rim RIL. According to the position relationship between the measurement reference position (COR) of the right rim RIR and the measure reference position (COL) of the left rim RIL, the position relationship in the right and left direction (X direction) between the target lens shape FRT1 and target lens shape FTL1 can also be obtained. The nose width DBL, which is the nose side distance between the right rim RIR and left rim RIL, is obtained as the distance between the point BR on the nose side end of the target lens shape FTR1 and the point BL on the nose side end of the target lens shape FTL1. In order to use as the base for the processing data on the eyeglass lens, the three-dimensional peripheral length value FN3DR1 of the groove of the right rim RIR and the three-dimensional peripheral length value FN3DL1 of the groove of the left rim RIL are obtained by the control portion 50 according to the respective three-dimensional shape data of the rims RIR and RIL.

The thus obtained target lens shape data (both or one of FTR1 and FTL1), geometric inter-center distance FPD, frame curve angle α1 (αR1, αL1), nose width DBL, and data on the peripheral length value are stored into memory 51. On receiving the signal of the data transfer switch of the panel portion 3, or on receiving a signal requiring data transfer from an externally connected apparatus 1000 such as an external computer and eyeglass lens processing apparatus connected to a communication unit 52, the communication unit 52 outputs the stored data to the externally connected apparatus 1000. The communication unit 52 has the functions of a signal input unit and a data output unit.

Here, the target lens shapes (FTR1, FTL1) measured by the measuring unit 200 are provided as shapes obtained when the right and left rims of the eyeglass frame F are projected in a predetermined direction (for example, in the front direction). As target lens shapes to be used in processing the peripheral edge of the eyeglass lens, they may be as they are but, preferably, they may be shape data obtained after they are corrected according to the frame curve angles (αR1, αL1) in the X direction. For example, for the shape of the right rim RIR, the control portion 50 defines, as a new z direction, the direction of the perpendicular bisector of the line segment TAR connecting the points V1R and V2R on the datum line DL, and re-obtains the target lens shape data as shape data obtained when the three-dimensional shape data F3DR1 of the right rim are projected on the xy plane perpendicular to the new z direction. This can reduce the eyeglass lens periphery processing error. This applies similarly to the left rim RIL. More preferably, when obtaining the target lens shape, the shape may be corrected according to the frame curve angle in the Y direction. Such computing can be carried out according to a similar method to a correcting method with the frame curve angle in the X direction taken into account.

Next, description is given of measurement to be executed for the eyeglass frame F consisting of a high curve frame where the curve of the frame (rim) is large to cause the tracing stylus to diverge from the rim, or where the rim position in a direction (Z direction) perpendicular to the radius vector direction is out of the measurement allowable range. When the curve of the eyeglass frame (rim) is large and thus, in the two-rim support tracing mode, the curving direction of the groove of the rim and the facing angle of the leading end of the tracing stylus are caused to diverge from each other, the tracing stylus is disengaged from the groove, resulting in a measuring error. In the two-rim support trace mode, when the position of the rim varies greatly in the Z direction, the rim position is out of the measurement allowable range, resulting in a measuring error. In such measuring errors, measurement is carried out in the nose side portion trace mode in addition to the right rim support trace mode and left rim support trace mode. When executing the measurement in the nose side portion trace mode, an operator operates the switch 3a to input a specification signal allowing the memory 51 to store the respective pieces of data to be obtained in the nose side portion trace mode, right rim support trace mode and left rim support trace mode to be executed later while they are made to correspond to each other as sets of corresponding data.

<Nose Side Portion Trace Mode>

Description is given of the nose side portion trace mode. The operator, similarly to the two-rim support trace mode, clamps the right and left rims of the eyeglass frame F with the clamp pins 230a and 230b to set a state where the two rims of the eyeglass frame F are held by the hold unit 100. In the nose side portion trace mode as well, a method for holding the right left rims of the eyeglass frame F is similar to the two-rim support trace mode shown in FIG. 5. Thus, the illustration thereof is omitted here.

When the nose side portion trace mode is set using the switch 4d and its measurement start signal is input, the control portion 50, after driving the measurement unit 200 to measure partially the nose side portion within a predetermined range including the nose side end BR2 of the right rim RIR, drives the measurement unit 200 to measure partially the nose side portion within a predetermined range including the nose side end BL2 of the left rim RIL and, according to the measured results obtained by such measurement, obtains, as the mutual position relationship data between the shapes of the right and left rims, the nose width data DBL between the nose side end BR2 of the right rim and the nose side end BL2 of the left rim.

Figure 7:
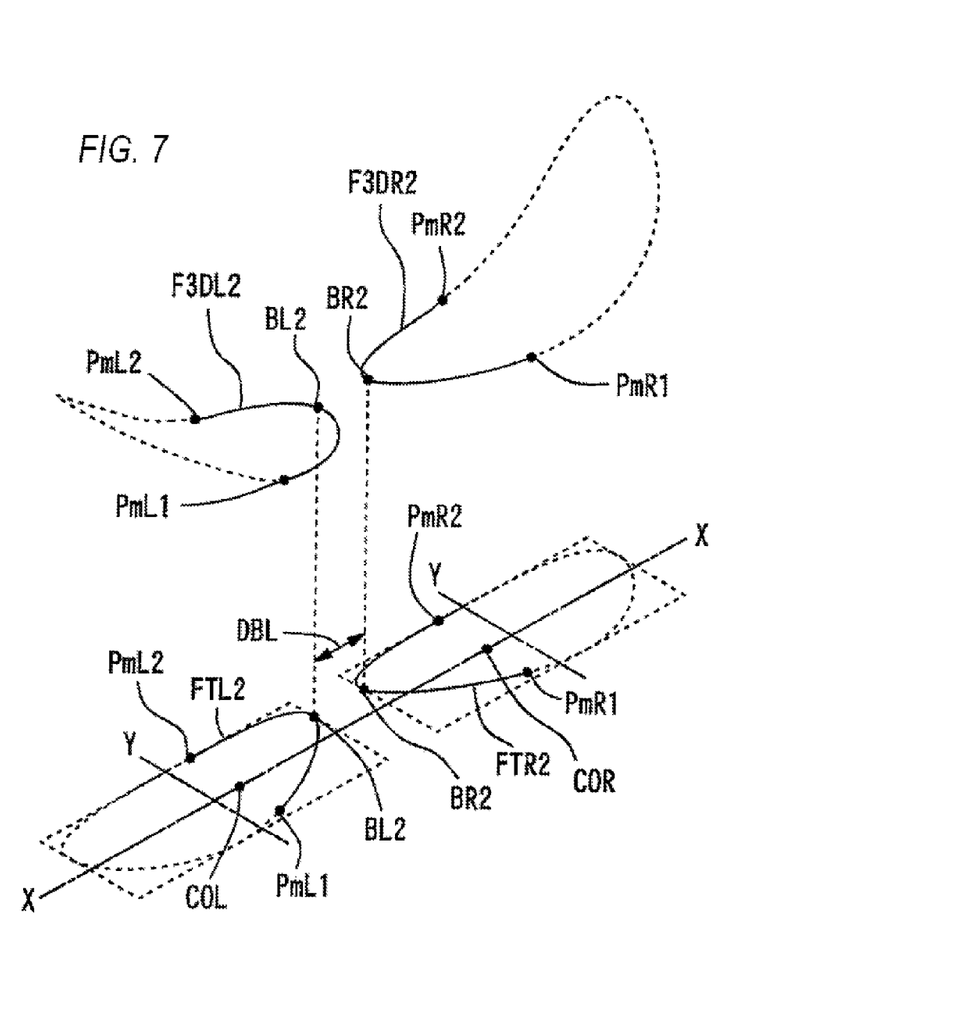
FIG. 7 shows an example of measured results obtained in a nose side portion trace mode.

FIG. 7 shows an example of measured results obtained in the nose side portion trace mode. In FIG. 7, F3DR2 shown by a solid line is the partial three-dimensional shape data on the right rim RIR, while F3DL2 shown by a solid line is the partial three-dimensional shape data on the left rim RIL. FTR2 shown by a solid line is the partial two-dimensional target lens shape data (radius vector data) on the right rim RIR, while FTL2 shown by a solid line is the partial two-dimensional target lens shape data (radius vector data) on the left rim RIL. The illustration method is similar to FIG. 6.

The control portion 50, for example, similarly to the two-rim support trace mode, while the position of the clamp pins 230a, 230b existing on the lower side of the right rim RIR is used as the measurement start position, drives the moving unit 210 to move the tracing stylus 281 to the measurement start position PmR1. After then, the control portion 50 drives the moving unit 210 to move the tracing stylus 281 toward the nose of the right rim RIR. And, when the tracing stylus 281 reaches a position PmR2 which is 180° opposite to the measurement start position PmR1, the measurement of the right rim RIR is ended. Since a nose side end BR2 is interposed between the position PmR1 and the 180° opposite position PmR2, results including the nose side end BR2 can be obtained.

On completion of the measurement of the right rim RIR, the control portion 50 moves the tracing stylus 281 to an initial position COL set for measurement of the left rim RIL. After then, while the position of the clamp pins 230a, 230b existing on the lower side of the left rim RIL is used as a measurement start position PmL1, the control portion 50 drives the moving unit 210 to move the tracing stylus 281 to the measurement start position PmL1. The control portion 50, similarly to the measurement of the right rim RIR, drives the moving unit 210 to move the tracing stylus 281 toward the nose of the left rim RIL and, when the tracing stylus 281 reaches a position PmL2 which is 180° opposite to the position PmL1, ends the measurement of the left rim RIL. Since a nose side end BL2 is interposed between the position PmL1 and the 180° opposite position PmL2, expected results including the nose side end BL2 can be obtained.

Thus, the nose side portion within the predetermined range of the right rim RIR including the nose side end BR2 and the nose side portion within the predetermined range of the left rim RIL including the nose side end BL2 are measured. Even in the case of the high curve frame F suffering from the measuring error in the two-rim support tracing mode, in such range of the nose side portion as shown in FIG. 7, since the tracing stylus 281 is not disengaged from the groove of the rim and the rim varies only slightly in the Z direction, such range can be measured with a high probability. Here, the measuring range of the nose side portion including the nose side end BR2 may also be an area ranging from the predetermined measurement start positions (PmR1, PmL1) to portions where the nose side ends BR2 and BL2 can be obtained respectively. The position of the nose side end BR2 of the right rim can be obtained as a point where, within the radius vector data FTR2 of the right rim RIR, a variation in the X direction is turned from an increase to a decrease. The position of the nose side end BL2 of the left rim can also be obtained similarly.

After the three-dimensional shape data F3DR2 of the nose side portion of the right rim RIR including the nose side end BR2 and the three-dimensional shape data F3DL2 of the nose side portion of the left rim RIL including the nose side end BL2 are obtained, the nose width DBL2 can be obtained according to these measured results. For example, since the initial position COR in the measuring time of the right rim RIR and the initial position COL in the measuring time of the left rim RIL are known, the position relationship between the three-dimensional shape data F3DR2 based on the initial position COR and the three-dimensional shape data F3DL2 based on the initial position COL can be obtained, thereby being able to obtain the nose width DBL2. Data on the three-dimensional shape data F3DR2, F3DL2 and nose width DBL2 respectively obtained in the nose side portion trace mode are stored into the memory 51.

<One Rim Support Trace Mode>

When a measuring error occurs in the two-rim support trace mode, in order to obtain three-dimensional shape data, target lens shape data and the like on the right rim RIR and left rim RIL, the operator sets a one rim support trace mode and measures the whole periphery of at least one of the right and left rims. Preferably, the respective whole peripheries of the right and left rims may be measured in a right rim support trace mode and in a left rim support trace mode. Description is given below of a case where the right rim support trace mode and left rim support trace mode are set.

Figure 8:
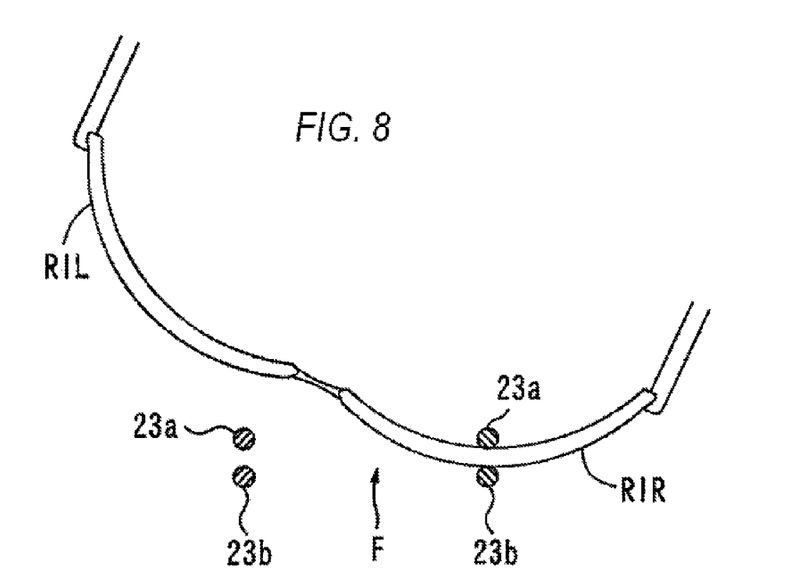
FIG. 8 shows a state where the frame F is held by the frame hold unit in one rim support trace mode.

In order to start the measurement in the right rim support trace mode, the operator manually holds the left temple or the like of the eyeglass frame F, holds the right rim RIR between the first and second sliders 102 and 103 in such a manner that the right and left direction of the right rim RIR can be as horizontal as possible, and operates the clamp pins 230a, 230b for the right rim to clamp the upper and lower portions of the right rim RIR. In this state, when a measurement start signal in the right rim support trace mode is input by the switch 4b, the control portion 50 drives the measurement unit 200 to measure the whole peripheral shape of the right rim RIR. When the shape of the whole periphery of the right rim RIR is obtained, the measurement is ended. The measuring operation is similar to the measurement of the right rim RIR in the two-rim support trace mode. Thus, the description thereof is omitted.

On completion of the measurement in the right rim support trace mode, the operator removes the frame F, holds the left rim RIL between the first and second sliders 102 and 103 in such a manner that the right and left direction of the left rim RIL can be as horizontal as possible, and operates the clamp pins 230a, 230b for the left rim to clamp the upper and lower portions of the left rim RIL. In this state, when a measurement start signal in the left rim support trace mode is input by the switch 4c, the control portion 50 drives the measurement unit 200 to measure the shape of the whole periphery of the left rim RIL.

Figure 9A:
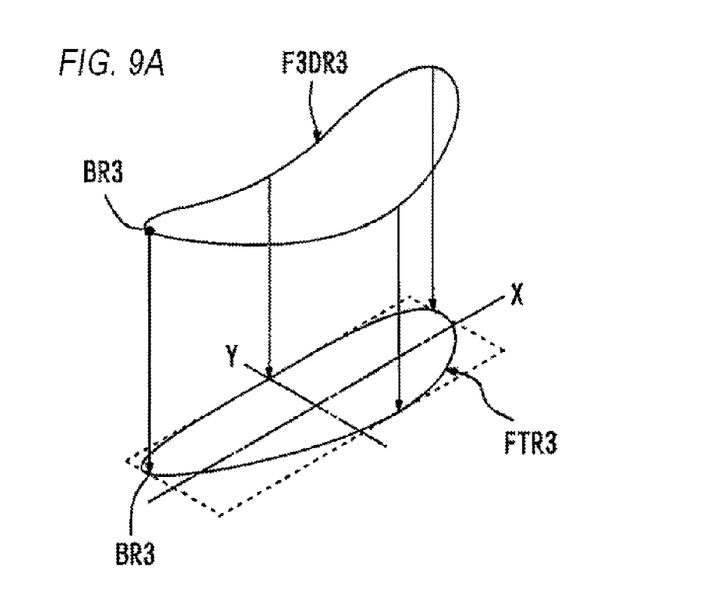
FIG. 9A shows an example of measured results obtained in a right rim support trace mode.
Figure 9B:
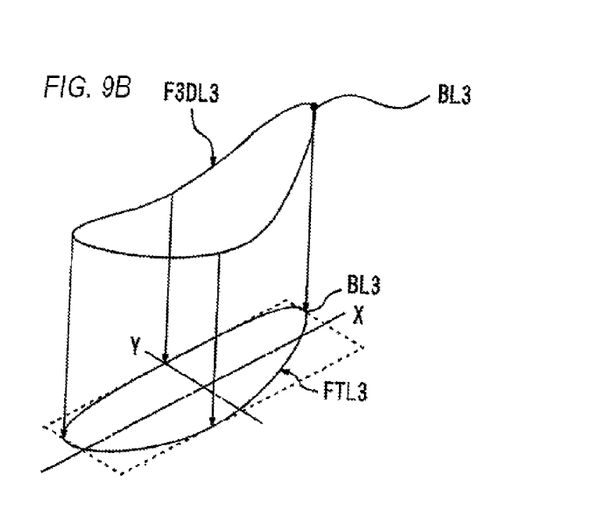
FIG. 9B shows an example of measured results obtained in a left rim support trace mode.

FIG. 9A shows an example of the measured results obtained in the right rim support trace mode. In FIG. 9A, F3DR3 is data on the three-dimensional shape of the whole periphery of the right rim RIR and FTR3 is data on two-dimensional target lens shape (radius vector data) obtained when the three-dimensional shape data F3DR3 are projected on the XY plane. FIG. 9B shows an example of the measured results obtained in the left rim support trace mode. In FIG. 9B, F3DL3 is data on the three-dimensional shape of the whole periphery of the left rim RIL and FTL3 is data on two-dimensional target lens shape (radius vector data) obtained when the three-dimensional shape data F3DL3 is projected on the XY plane.

In the one rim support trace mode, in the case that measurement is set to be ended when data on the shape of the whole periphery of one of the right and left rims is obtained, data on the shape of the other rim can be obtained according to a processing (mirror reversing processing) for reversing the right and left of the shape data of one rim obtained. This computing is executed by the control portion 50.

The respective pieces of data obtained by measurements made in the nose side portion trace mode and one rim support trace mode (right rim support trace mode and left rim support trace mode) are made to correspond to each other as they are sets of corresponding data on the same frame F since the signal of the switch 3a has been input initially (or after end of the measurements in the respective modes), and are then stored into the memory 51.

Here, the measurement execution order of the nose side portion trace mode and one rim support trace mode may be arbitrary.

<Matching Processing of Three-Dimensional Shape Data>

Description is given of matching processing on the data obtained in the nose side portion trace mode and one rim support trace mode. When an instruction signal for "matching processing execution" is input by the switch 3b, the control portion 50 calls the measurement data in the respective modes stored in the form sets of corresponding data in the memory 51 and executes three-dimensional data matching on them. Here, there may also be employed a structure that, when the measured results in the respective modes (nose side portion trace mode and one rim support trace mode) are obtained, the control portion 50 automatically issues an instruction signal "matching processing execution" and the signal is input.

The control portion 50, according to the partial three-dimensional shape data F3DR2 of the right rim obtained in the nose side portion trace mode, carries out a computing to move the three-dimensional shape data F3DR3 of the right rim obtained in one rim support tracing mode to allow the data F3DR3 to match. Similarly, the control portion 50, according to the partial three-dimensional shape data FeDL2 of the left rim obtained in the nose side portion trace mode, carries out a computing to move the three-dimensional shape data F3DL3 of the left rim obtained in one rim support trace mode to allow the data F3DL3 to match.

Figure 10:
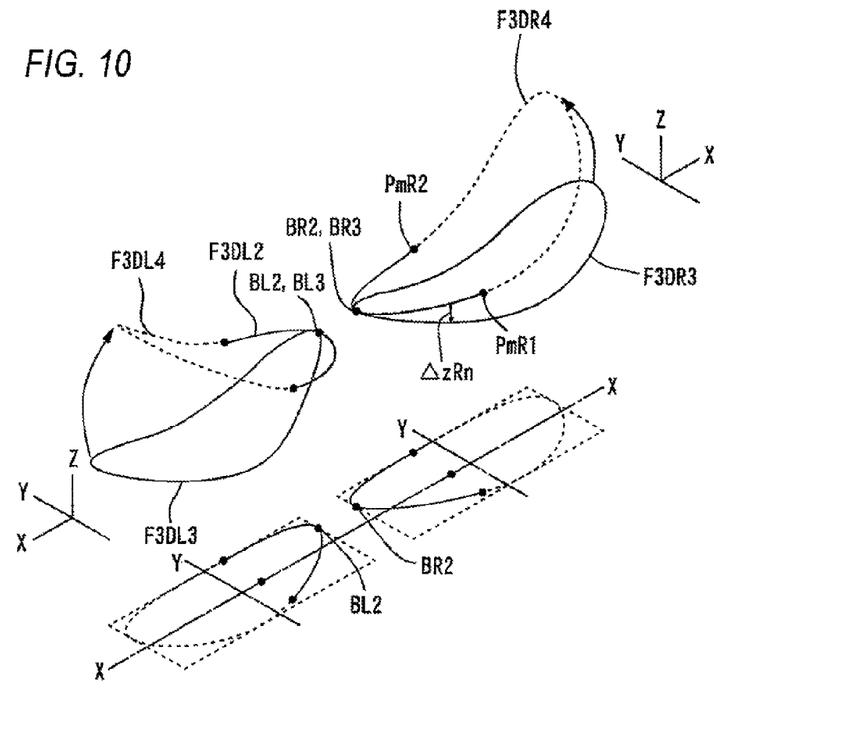
FIG. 10 is an explanatory view of a computing example of matching processing.

FIG. 10 is an explanatory view of a computing example of the matching processing. Firstly, description is given of the right rim RIR matching processing. The control portion 50, according to the position of the nose side end BR2 of the three-dimensional shape data F3DR2 obtained in the nose side portion trace mode, moves the whole of the three-dimensional shape data F3DR3 of the right rim RIR in such a manner that the position of the nose side end BR3 in the three-dimensional shape data F3DR3 coincides with the position of the nose side end BR2. Next, the control portion 50, according to the nose side end BR3 made coincident with the position of the nose side end BR2, rotates the three-dimensional shape data F3DR3 at an arbitrary angle in the Z direction to obtain the Z-direction difference $\Delta ZRn$ between the current three-dimensional shape data F3DR2 and data F3DR3 in every radius vector measuring points in the data F3DR2 (for example, measuring points every 0.36 degrees with the initial position COR as reference). And, the rotation angle of the data F3DR3 in the Z direction is kept on changing so that the total sum of the differences $\Delta ZRn$ in the respective points can be smallest. The data F3DR3 when the total sum of the differences $\Delta ZRn$ becomes smallest is stored into the memory 51 as the three-dimensional shape data F3DR4 of the right rim RIR after the matching processing.

When obtaining the three-dimensional shape data F3DR4, preferably, matching processing in the XY direction may be executed on the partial data F3DR2. In this case, the radius vector data difference $\Delta XYRn$ between the three-dimensional shape data F3DR3 is obtained and, by moving the data F3DR3 so that the differences $\Delta XYRn$ in the respective points become smallest, the three-dimensional shape data F3DR4 is obtained.

The left rim RIL can be matching processed similarly to the right rim RIR. That is, the control portion 50, according to the position of the nose side end BL2 of the three-dimensional shape data F3DL2 obtained in the nose side portion trace mode, moves the whole of the three-dimensional shape data F3DL3 of the left rim RIL so that the position of the nose side end BL3 in the three-dimensional shape data F3DL3 coincides with the position of the nose side end BL2. And, the control portion 50, according to the nose side end BL3 made coincident with the position of the nose side end BL2, rotates the three-dimensional shape data F3DL3 in the Z direction to thereby match the data F3DL3 to the partial data F3DL2 as much as possible, and stores the thus matched data F3DL3 into the memory 51 as the three-dimensional shape data F3DL4 of the left rim RIL after matching processing. Preferably, by executing matching processing in the XY direction, the three-dimensional shape data F3DL4 may be obtained.

Here, when in the three-dimensional shape data matching processing includes processing for rotating the three-dimensional shape data F3DR3 and F3DL3 in the Y direction, the matching processing can be executed more accurately. This processing can be executed similarly to the case of the rotation in the Z direction.

Figure 11:
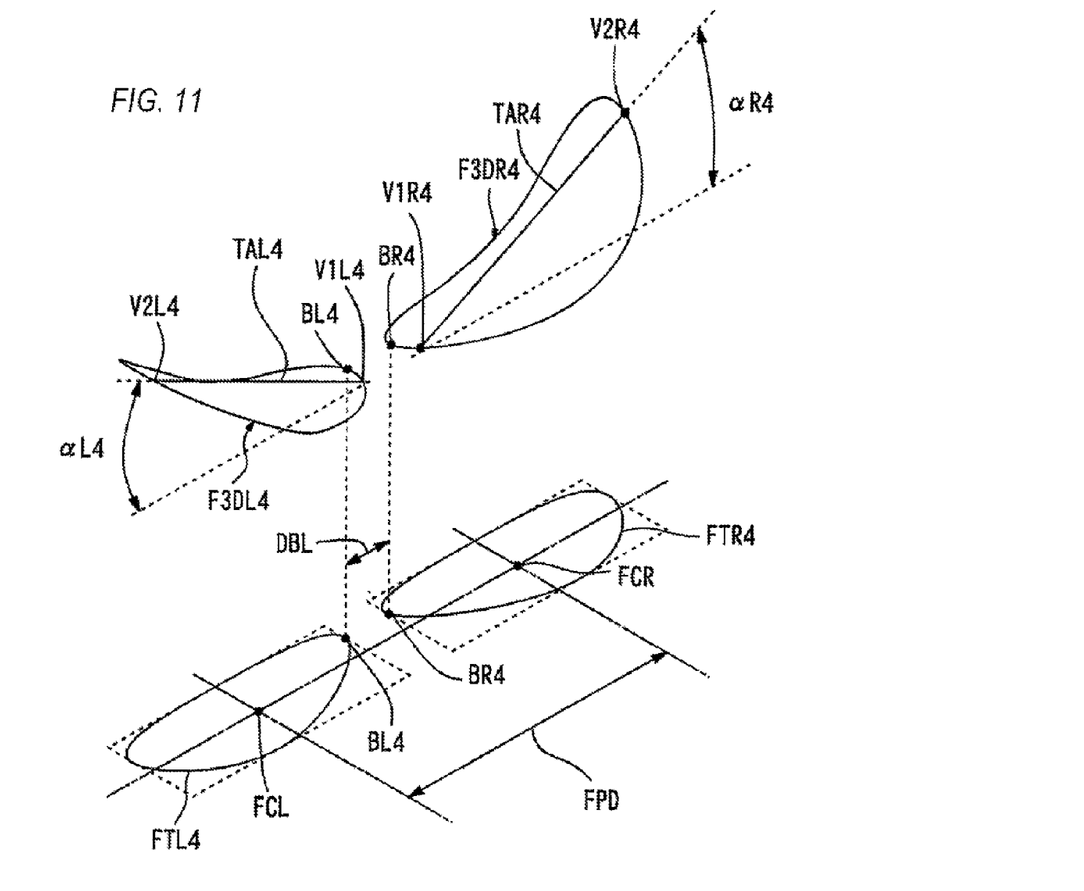
FIG. 11 shows the respective pieces of three-dimensional shape data of the right and left rims rebuilt by matching processing.

FIG. 11 shows the respective three-dimensional shape data F3DR4 and F3DL4 of the right rim RIR and left rim RIL rebuilt by the matching processing. The three-dimensional shape data F3DR4 and F3DL4, similarly to FIG. 6, can be regarded as the measured results in the two-rim support trace mode. In FIG. 11, FTR4 is two-dimensional target lens shape data (radius vector data) obtained by projecting the three-dimensional shape data F3DR4 on the XY plane, while FTL4 are two-dimensional target lens shape data (radius vector data) obtained by projecting the three-dimensional shape data F3DL4 on the XY plane.

When the three-dimensional shape data F3DR4 and F3DL4 corresponding to the measured results in the two-rim support trace mode are obtained, similarly to the normal two-rim support trace mode, the curve angle αR4 of the right rim RIR, the curve angle αL4 of the left rim RIL and the geometric inter-center distance FPD between the right and left rims can be respectively obtained according to the three-dimensional shape data F3DR4 and F3DL4.

That is, the geometric center (boxing center) of the target lens shape FTR4 is expressed as FCR, while an X-direction line passing through the geometric center FCR is expressed as a datum line DL. In the three-dimensional shape data F3DR4, a line segment connecting a nose-side point V1R4 in the X direction existing on the datum line DL and an ear-side point V2R4 in the X direction is expressed as TAR4. An angle αR4 formed between the line segment TAR4 and X-axis direction is obtained as the curve angle of the right rim RIR. Similarly, an X-direction line passing through the geometric center FCL of the target lens shape FTL4 is expressed as a datum line DL and, in the three-dimensional shape data F3DL4, a line segment connecting a nose-side point V1L4 in the X direction existing on the datum line DL and an ear-side point V2L4 in the X direction is expressed as TAL4. An angle αR4 formed between the line segment TAL4 and X-axis direction is obtained as the curve angle of the left rim RIL. The curve angle of the frame F may also be obtained as the average curve angle α4 of the angles αR4 and αL4. In the nose side portion trace mode, in the case that the right and left rims are held uniformly by the frame hold unit 100, as the curve angle of the frame F, at least one of the curve angle αR4 of the right rim RIR and the curve angle αL4 of the left rim RIL may be obtained. In the case that only one of the curve angles is obtained, the other may be regarded as the same curve angle.

The geometric inter-center distance FPD is obtained as the distance between the geometric centers FCR and FCL on FIG. 11. Here, although the nose width DBL can be obtained from the measured results in the nose side portion trace mode, it may also be obtained as the distance between the nose side end BR4 of the rebuilt three-dimensional shape data F3DR4 and the nose side end BL4 of the rebuilt three-dimensional shape data F3DL4. The nose width DBL and geometric inter-center distance FPD as the mutual position relationship data of the right and left rims are used to set layout (the position relationship of the optical center position of the eyeglass lens with respect to the target lens) when processing the periphery of the eyeglass lens. For this purpose, one of the nose width DBL and geometric inter-center distance FPD may be enough and thus the control portion 50 may obtain at least one of DBL and FPD.

The three-dimensional peripheral length value FN3DR4 of the groove of the right rim RIR is obtained according to the three-dimensional shape data F3DR4, while the three-dimensional peripheral length value FN3DL4 of the groove of the left rim RIL is obtained according to the three-dimensional shape data F3DL4.

DBL, FPD, curve angle α4 (αR4, αL4), three-dimensional peripheral length values FN3DR4, FN3DL4 and the like, which are the mutual position relationship data of the right and left rims obtained through execution of the respective trace modes and through execution of the matching processing, are stored into the memory 51 in the form of sets of corresponding data as the data of the same frame. And, when an instruction signal for data transfer is input by the panel portion 3 or the like, the data stored in the memory 51 in the form of sets of corresponding data as the data of the same frame are output from the communication unit 52 to the externally connected apparatus 1000.

The foregoing description has been given of the preferred embodiment and thus various changes are also possible. For example, the three-dimensional data matching processing may also be executed by the externally connected apparatus 1000. In this case, the control portion 50 may output the data stored in the memory 51 as the data of the same frame, namely, the data obtained by measurement in the nose side portion trace mode and the data of at least one of the right and left rims obtained by measurement in the one rim support trace mode, from the communication unit 52 to the externally connected apparatus 1000 in the form of sets of corresponding data. When the data on one of the right and left rims is output, the data on the other may be obtained by reversing the right and left of the data on one rim (for example, when the data on the right rim is output, the data on the left rim may be obtained by reversing the right and left of the data on the right rim). In this case as well, since the data obtained by measurement in the nose side portion trace mode is included in the output data, the externally connected apparatus 1000 can obtain the mutual position relationship data between the shapes of the right and left rims.

In the case that the curve angle of the frame (rim) is obtained separately, the three-dimensional shape data matching processing is not always necessary. For example, the curve angle of the frame (rim) can be obtained using the technology disclosed in Japanese Patent Publication 2007-233009. According to this technology, for example, an index (angle memory) for measuring the curve angle of the frame (rim) is displayed on the screen of the panel 3 (display), an operator puts the frame (rim) on the screen and reads visually the curve angle of the frame, and inputs the read curve angle into the present apparatus 1 using a switch provided on the panel 3. The three-dimensional shape data F3DR3 and F3DL3 respectively obtained by measurement in the right rim support trace mode and left rim support trace mode according to the input curve angle are projected on the XY plane in the front direction, thereby being able to obtain the two-dimensional target lens shapes FTR3 and FTL3. When the data on the nose width DBL obtained by measurement in the nose side portion trace mode is available, the geometric inter-center distance FPD can be obtained according to the nose width DBL and two-dimensional target lens shapes FTR3, FTL3.

In the case that the curve angle of the frame is input separately, the data on the nose width DBL obtained by measurement in the nose side portion trace mode and the three-dimensional shape data F3DR3 and F3DL3 stored in the memory 51 as sets of data corresponding to the DBL data may also be output from the communication unit 52 to the externally connected apparatus 1000. In this case, the externally connected apparatus 1000 can obtain the two-dimensional target lens shapes FTR3, FTL3, geometric inter-center distance FPD and the like.

The need for measurement in the nose side portion trace mode may not be judged by the operator but may be determined by the control portion 50. That is, in the case that measurement in the two-rim support trace mode is started and the measurement is caused to raise a measuring error due to the above-mentioned factor or the like, the control portion 50 displays on the screen of the panel 3 a message for urging the execution of measurement in the nose side portion trace mode. Further, after end of the measurement in the nose side portion trace mode, the control portion 50 displays on the screen of the panel 3 a message for urging the execution of measurement in one rim support trace mode (preferably, right rim support trace mode and left rim support trace mode). Thus, even an operator not used to measurement can cope with such measuring error smoothly.

Further, in the case that the execution of measurement in the two-rim support tracing mode results in a measuring error, in a state where the right and left rims of the frame are held by the frame hold unit 100, the control portion 50 may automatically issue (input) a signal for starting measurement in the nose side portion trace mode and the measurement in the nose side portion trace mode may be executed as it is. This can save the time and labor of the operator conveniently. After end of the measurement in the nose side portion trace mode, the control portion 50 displays on the screen of the panel 3 a message for urging execution of measurement in one rim support trace mode.

The concept of the nose width DBL and geometric inter-center distance FPD may include a case where they are respectively calculated as the value of one of the right and left sides and are then output. For example, the nose width DBL can be expressed as ½ DBL with the right and left centers of the right and left rims as reference.

As described above, in the invention, various changes are possible and these changes also fall within the scope of the invention.

What is claimed is:

1. An eyeglass frame shape measurement apparatus, comprising:
   a frame holder configured to hold right and left rims of an eyeglass frame, the right and left rims including grooves respectively;
   a measuring unit including a tracing stylus configured to be inserted into the grooves of the right and left rims, and detect movement of the tracing stylus to measure shapes of the rims;
   a first measurement start signal input unit configured to input a first measurement start signal for a first measuring mode in which whole peripheries of the right and left rims are measured in a state that the right and left rims of the eyeglass frame are held by the frame holder;
   a second measurement start signal input unit configured to input a second measurement start signal for a second measuring mode in which the whole periphery of one of the right and left rims of the eyeglass frame is measured in a state that the one of the right and left rims of the eyeglass frame is held by the frame holder;
   a third measurement start signal input unit for inputting a third measurement start signal for a third measuring mode in which nose side portions of the left rim and the nose side portion of the right rim are partially measured in a state that the right and left rims of the eyeglass frame are held by the frame holder, the nose side portions including nose side ends of the left and right rims; and
   a controller configured to drive the measuring unit to measure the whole peripheries of the right and left rims when the first measurement start signal is input, for driving the measuring unit to measure the whole periphery of the one of the left and right rims held by the frame holder when the second measurement start signal is input, and for driving the measuring unit to measure partially the nose side portions of the left and right rims when the third measurement start signal is input.

2. The eyeglass frame shape measurement apparatus according to claim 1, wherein
   the controller is configured to match the measured result obtained in the second measuring mode with the measured result obtained in the third measuring mode,
   the controller is configured to execute:
   first computing processing to move second left shape data of the left rim obtained in the second measuring mode with respect to first partial left shape data of the left rim obtained in the third measurement mode so that the second left shape data matches the first partial left shape data, to generate third left shape data of the left rim in a state that the left and right rims are held by the frame holder, and
   second computing processing to move second right shape data of the right rim obtained in the second measuring mode with respect to first partial right shape data of the right rim obtained in the third measurement mode so that the second right shape data matches the first partial right shape data, to generate third right shape data of the right rim in a state that the right and left rims are held by the frame holder; and
   the eyeglass frame shape measurement apparatus further comprises a computing instruction unit is configured to input an instruction signal for instructing the controller to execute the first and second computing processing.

3. The eyeglass frame shape measurement apparatus according to claim 2, wherein
   the first computing processing obtains the third left shape data by comparing a position of the nose side end contained in the first left shape data with a position of the nose side end contained in the second left shape data, and
   the second computing processing obtains the third right shape data by comparing a position of the nose side end contained in the first right shape data with a position of the nose side end contained in the second right shape data.

4. The eyeglass frame shape measurement apparatus according to claim 2, wherein the controller obtains position relationship data between the right and left rims based on the generated third left shape data of the left rim and the generated third right shape data of the right rim.

5. The eyeglass frame shape measurement apparatus according to claim 4, wherein the controller obtains, as the position relationship data, a geometric inter-center distance between a geometric center of the left rim and a geometric center of the right rim when the eyeglass frame is viewed from a predetermined direction.

6. The eyeglass frame shape measurement apparatus according to claim 4, wherein the controller obtains, as the position relationship data, at least one of a curve angle of the left rim and a curve angle of the right rim based on the generated third left shape data of the left rim and the generated third right shape data of the right rim.

7. The eyeglass frame shape measurement apparatus according to claim 2, wherein the controller issues an instruction signal automatically when the measured results in the third measuring mode and in the second measuring mode are obtained.

8. The eyeglass frame shape measurement apparatus according to claim 1, wherein
the controller is configured to obtain position relationship data between the shape of the right rim and the shape of the left rim based on the measured results obtained by the measurement in the third measuring mode, and
the controller obtains, as the position relationship data, a nose width distance between the nose side end of the right rim and the nose side end of the left rim.

9. An eyeglass frame shape measurement apparatus, comprising:
a frame holder configured to hold right and left rims of an eyeglass frame, the right and left rims including grooves respectively;
a measuring unit including a tracing stylus configured to be inserted into the grooves of the right and left rims, and detect movement of the tracing stylus to measure shapes of the rims;
a first measurement start signal input unit configured to input a first measurement start signal for a first measuring mode in which whole peripheries of the right and left rims are measured in a state that the right and left rims of the eyeglass frame are held by the frame holder;
a second measurement start signal input unit configured to input a second measurement start signal for a second measuring mode in which the whole periphery of one of the right and left rims of the eyeglass frame is measured in a state that the one of the right and left rims of the eyeglass frame is held by the frame holder;
a third measurement start signal input unit for inputting a third measurement start signal for a third measuring mode in which a nose side portion of the left rim and a nose side portion of the right rim are measured, the nose side portions including node side ends of the left and right rims, the third measurement mode thereby recording a measurement value for a partial periphery of the left rim and a measurement value for a partial periphery of the right rim; and
a controller configured to drive the measuring unit to measure the whole peripheries of the right and left rims when the first measurement start signal is input, for driving the measuring unit to measure the whole periphery of the one of the left and right rims held by the frame holder when the second measurement start signal is input, and for driving the measuring unit to measure a partial periphery corresponding to the nose side portions and representing less than the whole periphery of the left and right rims when the third measurement start signal is input.

* * * * *